(12) United States Patent
Pan et al.

(10) Patent No.: US 11,035,981 B2
(45) Date of Patent: Jun. 15, 2021

(54) AIR-HANG CALIBRATION FOR RESISTIVITY-LOGGING TOOL

(71) Applicant: Halliburton Energy Services, Inc., Houston, TX (US)

(72) Inventors: Li Pan, Singapore (SG); Hsu-Hsiang Wu, Sugar Land, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

(21) Appl. No.: 16/497,278

(22) PCT Filed: Nov. 16, 2018

(86) PCT No.: PCT/US2018/061624
§ 371 (c)(1),
(2) Date: Sep. 24, 2019

(87) PCT Pub. No.: WO2020/101709
PCT Pub. Date: May 22, 2020

(65) Prior Publication Data
US 2020/0408950 A1 Dec. 31, 2020

(51) Int. Cl.
*G01V 13/00* (2006.01)
*E21B 7/04* (2006.01)
(Continued)

(52) U.S. Cl.
CPC ............. *G01V 13/00* (2013.01); *E21B 7/04* (2013.01); *E21B 49/00* (2013.01); *G01V 3/20* (2013.01); *G01V 3/28* (2013.01)

(58) Field of Classification Search
None
See application file for complete search history.

(56) References Cited

U.S. PATENT DOCUMENTS 6,218,842 B1   4/2001   Bittar et al.
8,274,289 B2   9/2012   Bittar et al.
(Continued)

FOREIGN PATENT DOCUMENTS

WO   2006012497   2/2006

OTHER PUBLICATIONS

International Application No. PCT/US2018/061624, "International Search Report and Written Opinion", dated Aug. 13, 2019, 12 pages.

*Primary Examiner* — Douglas X Rodriguez
(74) *Attorney, Agent, or Firm* — Kilpatrick Townsend & Stockton LLP (57) ABSTRACT

A method for calibrating a resistivity-logging tool using air-hang calibration is provided. The method may include performing an air-hang measurement using the resistivity-logging tool and performing a first measurement decoupling operation on the air-hang measurement. The first measurement decoupling operation may include generating correcting factors based on a physical model and calculating an air-hang calibration matrix based on the correcting factors. Additionally, the method may include performing a formation measurement using the resistivity-logging tool and performing a second measurement decoupling operation on the formation measurement to generate a decoupled formation measurement matrix. Further, the method may include calibrating the resistivity-logging tool to generate a calibrated formation measurement matrix by subtracting the air-hang calibration matrix from the decoupled formation measurement matrix.

20 Claims, 4 Drawing Sheets

(51) Int. Cl.
*E21B 49/00* (2006.01)
*G01V 3/20* (2006.01)
*G01V 3/28* (2006.01)

(56) References Cited

U.S. PATENT DOCUMENTS

| | | |
|---|---|---|
| 2010/0156424 A1 | 6/2010 | Bittar et al. |
| 2011/0199088 A1 | 8/2011 | Bittar |
| 2015/0241596 A1* | 8/2015 | Donderici .............. G01V 13/00 324/338 |
| 2015/0301222 A1* | 10/2015 | Davydychev ............ G01V 3/28 324/338 |
| 2015/0338542 A1 | 11/2015 | Donderici |
| 2016/0002977 A1 | 1/2016 | Wu et al. |
| 2019/0331830 A1* | 10/2019 | Li ............................ G01V 3/28 |

\* cited by examiner

AIR-HANG CALIBRATION FOR RESISTIVITY-LOGGING TOOL

TECHNICAL FIELD

The present disclosure relates to calibrating a wellbore tool used to measure a characteristic of a wellbore. More specifically, this disclosure relates to an air-hang calibration of a resistivity-logging tool.

BACKGROUND

In oilfield services operations, resistivity-logging tools can be used to produce resistivity measurements of a formation surrounding a borehole, among other uses. The resistivity measurements may provide an operator of the resistivity-logging tool with information relating to formation characteristics. The formation characteristics may generally alert an operator to the presence of hydrocarbon-bearing formations.

The resistivity-logging tools may produce measurement irregularities when drilling without calibration. Calibration techniques can be used for the resistivity-logging tools. But, existing calibration techniques suffer from disruption at singularity conditions and from systematic bias due to the receivers of the resistivity-logging tool not being collocated.

DETAILED DESCRIPTION

Certain aspects and examples of the disclosure relate to calibrating a resistivity-logging tool using an air-hang calibration technique. The resistivity-logging tool is used to identify formation characteristics surrounding a wellbore. The air-hang calibration technique can involve firing the resistivity-logging tool while the resistivity-logging tool is located sufficiently far from any conductive materials or partially conductive materials (e.g., 20 feet above ground level) to generate air-hang measurements. Using the air-hang measurements, the resistivity-logging tool can be calibrated for subsurface measurements within the wellbore. By calibrating the resistivity-logging tool using the air-hang calibration technique, the resistivity-logging tool may take resistivity or conductivity measurements of a formation while avoiding disruptions at singularity conditions and reducing or eliminating a systematic bias associated with the resistivity-logging tool.

The singularity conditions may arise in certain calibration techniques at an offset azimuth angle of a receiver of the resistivity-logging tool. The offset azimuth angle may be a difference in azimuth angle between a transmitter and a receiver. The result is a calibration technique that is unable to calibrate a subsurface signal at the offset azimuth angle. Further, the systematic bias associated with certain calibration techniques may introduce error to a measurement signal of the resistivity-logging tool. The error may be a result of approximations in equations associated with calibration techniques. Certain examples using the presently disclosed air-hang calibration technique can avoid signal disruptions associated with both the singularity conditions and the systematic bias.

Resistivity-logging tools, according to some examples, may be used to help steer directional drilling operations. In other examples, the resistivity-logging tools may be used to identify pay zones within a formation surrounding a wellbore. The resistivity-logging tool can transmit and receive electromagnetic signals. The transmitted and received signals may travel through a formation surrounding a wellbore, and the resistivity measurements of the formation resulting from the interaction of the formation with the electromagnetic signals may provide an indication of formation characteristics.

A processing device may receive the measured signals to perform a calibration operation and to perform an inversion operation. The calibration operation can avoid irregularities from the measured signals associated with the performance of the resistivity-logging sensor or performance of a calibration technique, and the inversion operation can use calibrated signals to output quantitative formation properties. Thus, calibrating the measured signals using the air-hang calibration technique improves the field of resistivity-logging tool calibration.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
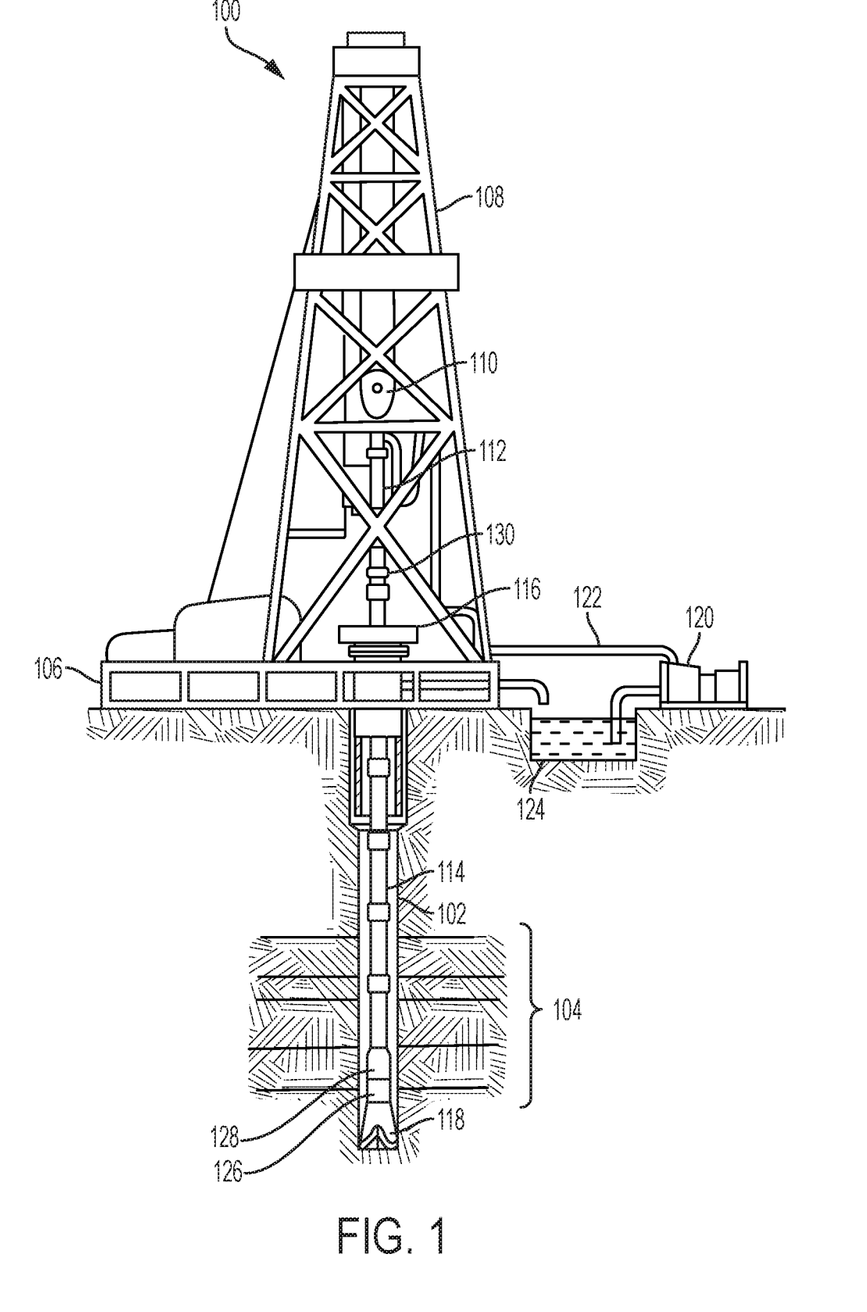
FIG. 1 is a cross-sectional view of an example of a well logging system that includes a resistivity-logging tool along a drill string according to some aspects of the present disclosure.

FIG. 1 is a cross-sectional view of an example of a well system 100 that includes a downhole logging tool according to some aspects. The well system 100 includes a wellbore 102 extending through a hydrocarbon-bearing subterranean formation 104. A drilling platform 106 is equipped with a derrick 108 that supports a hoist 110. The hoist 110 suspends a top drive 112 suitable for rotating a drill string 114 and lowering the drill string 114 through a wellhead 116. Connected to a downhole end of the drill string 114 is a drill bit 118. As the drill bit 118 rotates, it creates the wellbore 102 that pass through the layers of the formation 104. A pump 120 circulates drilling fluid through a supply pipe 122 to the top drive 112, down through an interior of the drill string 114, through orifices in the drill bit 118, back to the surface via an annulus around the drill string 114, and into a retention pit 124. The drilling fluid transports cuttings from the wellbore 102 into the pit 124 and also cools and lubricates the drill bit 118. Various materials may be used for the drilling fluid, including, but not limited to, a salt-water based conductive mud.

A resistivity-logging tool 126 is integrated into a bottom-hole assembly near the drill bit 118. In the illustrated embodiment, the resistivity-logging tool 126 is a logging while drilling (LWD) tool (e.g., usable during an LWD operation); however, in other embodiments, the resistivity-logging tool 126 may be used in a wireline or tubing-conveyed logging application. The resistivity-logging tool 126 may be, for example, a very deep resistivity (VDR) logging tool (e.g., with accurate readings at greater than 6 meters from the wellbore 102). Other types of resistivity-logging tools may also or alternatively be used. Additionally, the resistivity-logging tool 126 may be adapted to perform logging operations in both open and cased wellbore environments.

As the drill bit 118 extends the wellbore 102 through the formation 104, the resistivity-logging tool 126 collects resistivity measurement signals relating to various formation properties. A telemetry sub 128 may be included on the drill string 114 to transfer images and measurement data/signals to a surface receiver 130 and to receive commands from the surface of the well system 100. In some embodiments, the telemetry sub 128 does not communicate with the surface, but rather stores logging data for later retrieval at the surface when telemetry sub 128 is recovered.

The resistivity-logging tool 126 may include a tool control system (not shown), along with processing, storage, and communication hardware, that is communicatively coupled to one or more sensors (not shown) of the resistivity-logging tool 126. The one or more sensors of the resistivity-logging tool 126 are used to acquire formation measurement signals that represent formation characteristics. When the formation measurement signals are acquired, the tool control system decouples the measurements and uses an air-hang calibration technique to provide a final formation profile based on the measurements of the formation 104 received by the resistivity-logging tool 126, as discussed below with respect to FIG. 4. Upon obtaining the final formation profile, the data is sent uphole or to other assembly components by way of the telemetry sub 128. In another embodiment, the tool control system may be located at a remote location away from the resistivity-logging tool 126, such as at the surface or in a different borehole.

The logging sensors used by the resistivity-logging tool 126 may be resistivity sensors, such as magnetic or electric sensors. The magnetic sensors may include coil windings and solenoid windings that use induction to sense resistivity or conductivity of the formation 104. The electric sensors may include electrodes, linear wire antennas, or toroidal antennas that rely on Ohm's law to perform the measurements of the formation 104. Additionally, the sensors may be realizations of dipoles with an azimuthal moment direction and directionality, such as tilted coil antennas.

The resistivity-logging tool 126 may be a very deep resistivity-logging tool. Such tools may include one or more transmitter and receiver coils that are axially separated along the drill string 114. The transmitter coils may generate alternating displacement currents in the formation 104. The alternating displacement currents generate voltage at the one or more receiver coils. Because of the systematic bias associated with the resistivity-logging tool 126, an air-hang calibration may be implemented, as discussed in detail below with respect to FIG. 4, to eliminate the systematic bias in the readings of the resistivity-logging tool 126.

Figure 2:
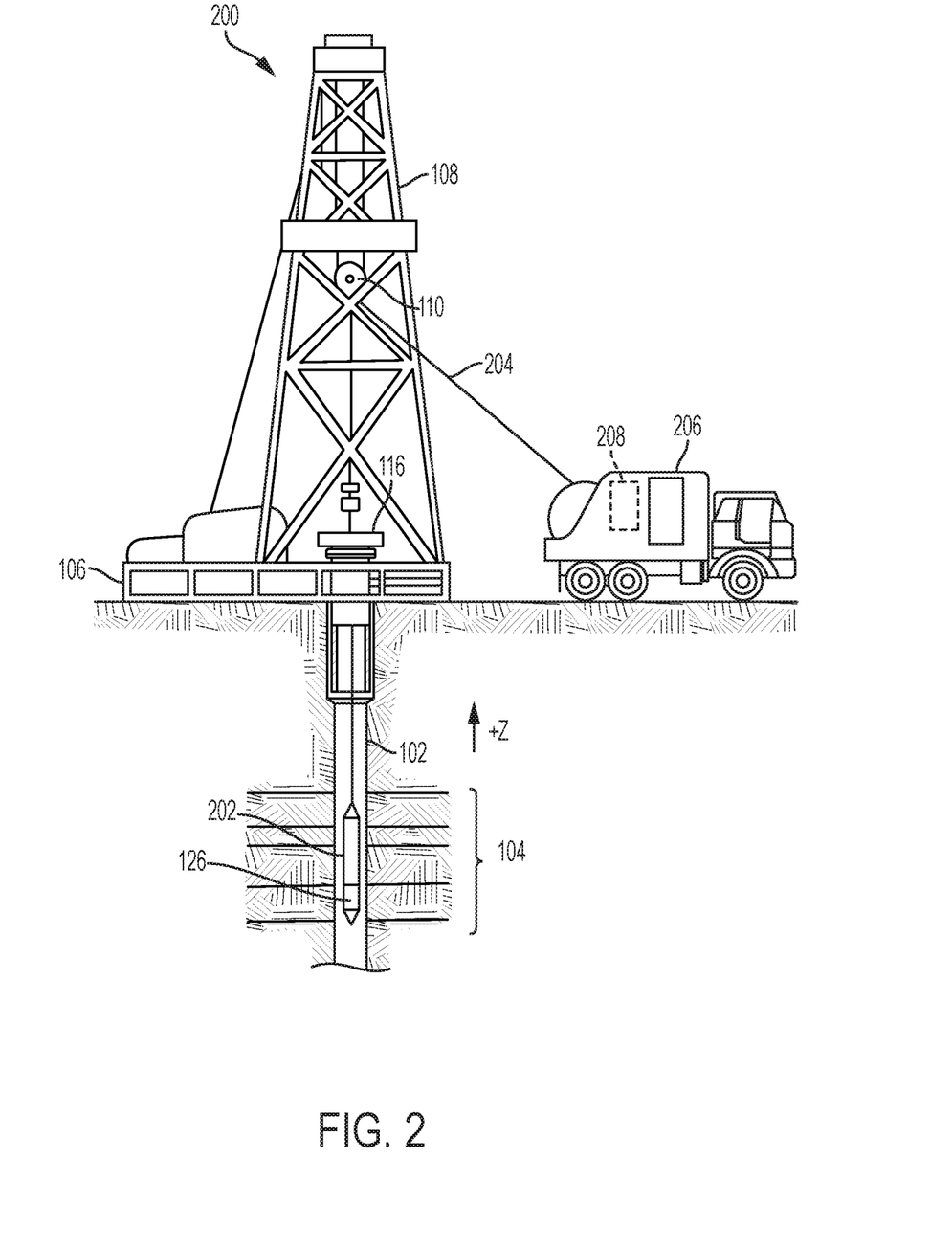
FIG. 2 is a cross-sectional view of an example of a well logging system that includes the resistivity-logging tool on a wireline logging tool according to some aspects of the present disclosure.

FIG. 2 is a cross-sectional view of an example of a well logging system 200 that includes the resistivity-logging tool 126 on a wireline logging tool 202 according to some aspects. At various times during the drilling process, the drill string 114 may be removed from the wellbore 102, as shown in FIG. 2. During these times, logging operations of the formation 104 may continue using the resistivity-logging tool 126 positioned along the wireline logging tool 202. The wireline logging tool 202 may include a probe suspended by a cable 204 having conductors that transport power to the wireline logging tool 202 and that transport telemetry data from the wireline logging tool 202 to the surface of the wellbore 102. A logging facility 206 collects measurements from the wireline logging tool 202, and the logging facility 206 includes a computer system 208 that processes and stores the measurements gathered by the sensors of the wireline logging tool 202.

The logging facility 206 and the computer system 208 may include one or more memory devices and one or more processing devices. The memory devices may include a non-transitory computer-readable medium capable of storing instructions for operation of the resistivity-logging tool 126 that are executable by the processing devices. Additionally, the memory devices may store the measurements gathered by the resistivity-logging tool 126. In one or more embodiments, the memory devices and the processing devices are located at the resistivity-logging tool 126 as an integrated resistivity-logging system. In other embodiments, the memory devices and the processing devices are located remotely from the resistivity-logging tool 126 and the wireline logging tool 202. Further, the memory devices and the processing devices may be located at the resistivity-logging tool 126 during an LWD operation, as discussed above with respect to FIG. 1. Similar to the resistivity-logging tool 126 positioned on the drill string 114, the one or more sensors of the resistivity-logging tool 126 positioned on the wireline logging tool 202 are used to acquire formation measurement signals that represent formation characteristics. When the formation measurement signals are acquired, the tool control system decouples the measurements and uses an air-hang calibration technique to provide a final formation profile based on the measurements of the formation 104 received by the resistivity-logging tool 126, as discussed below with respect to FIG. 4.

Figure 3:
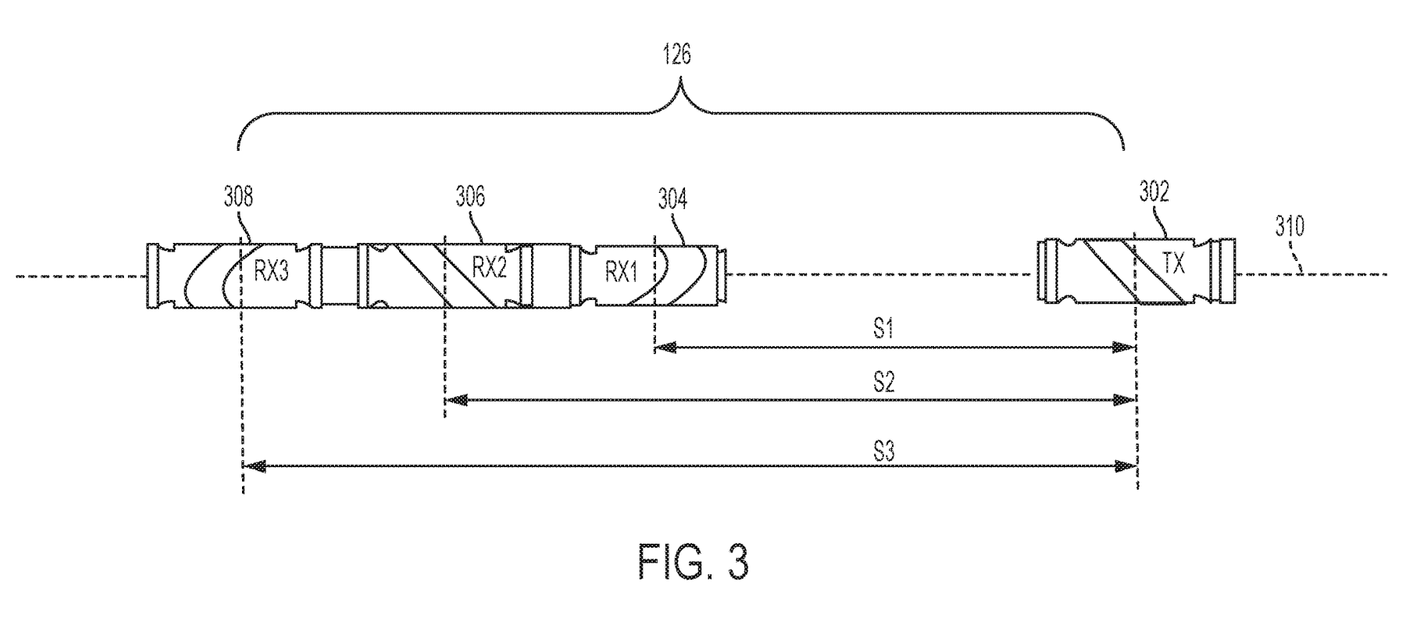
FIG. 3 is a side view of an example of a resistivity-logging tool that is calibrated using an air-hang technique according to some aspects of the present disclosure.

FIG. 3 is a side view of an example of the resistivity-logging tool 126 that is calibrated using an air-hang technique according to some aspects. The resistivity-logging tool 126 includes a transmitter 302 and three receivers 304, 306, and 308. The receivers 304, 306, and 308 may be resistivity sensors, such as magnetic or electric sensors. The transmitter 302 may include one or more coils that generate alternating displacement currents in the formation 104. The alternating displacement currents generate voltage at the one or more receivers 304, 306, and 308. The receivers 304, 306, and 308 may include coil windings and solenoid windings that use induction to sense resistivity or conductivity of the formation 104. In an embodiment, the receivers 304, 306, and 308 may include electrodes, linear wire antennas, or toroidal antennas that rely on Ohm's law to perform the measurements of the formation 104. Additionally, the receivers 304, 306, and 308 may be realizations of dipoles with an azimuthal moment direction and directionality, such as tilted coil antennas.

As illustrated, the first receiver 304 is spaced a distance S1 from the transmitter 302, the second receiver 306 is spaced a distance S2 from the transmitter 302, and the third receiver 308 is spaced a distance S3 from the transmitter 302. The receivers 304, 306, and 308 each include different azimuthal angles (i.e., rotational or tool face angles) in relation to an azimuthal angle of the transmitter 302. Further, the transmitter 302 and each of the receivers 304, 306, and 308 include tilt angles (i.e., an angular deviation from an axis 310 of the resistivity-logging tool 126). The tilt angle and the azimuthal angles of the receivers 304, 306, and 308 provide the resistivity-logging tool 126 with azimuthal sensitivity (i.e., directional sensitivity). For example, the tilt angles and the azimuthal angles of the illustrated resistivity-logging tool 126 enable directional resistivity measurements of the formation 104, which may aid in steering the drill bit 118 or gathering data about the formation 104 around the wellbore 102. Further, the tilt angles, the azimuthal angles, and the distances S1-S3 may be referred to as parameters of the receivers 304, 306, and 308 and the transmitter 302.

The transmitter 302 may generate an electromagnetic signal that travels into and through the formation 104 surrounding the wellbore 102. The receivers 304, 306, and 308 each receive the electromagnetic signal after the electromagnetic signal traverses the respective distances S1, S2, and S3. The formation 104 may interact with the electromagnetic signal in different ways depending on the composition of the formation. For example, a porous formation that includes salty water in the pores may have a minimal effect on the electromagnetic signal due to a low resistivity of the porous formation and high conductivity of the salty water. Alternatively, a dense formation rich with hydrocarbons may have a significant impact on the electromagnetic signal due to a very high resistivity of the dense formation and the hydrocarbons.

A comparison of the electromagnetic signals received at the receivers 304, 306, and 308 with the corresponding electromagnetic signals generated by the transmitter 302 may provide an indication of the resistivity of the formation 104. The resistivity of the formation 104 may provide an operator with an indication of the characteristics of the formation 104 (e.g., a low resistivity may indicate that no hydrocarbons are present in the formation 104). The characteristics of the formation 104 may provide a steering system of a drilling operation with steering input to maintain the wellbore 102 within a pay zone. In another embodiment, the characteristics of the formation 104 may provide an operator with an indication of a portion of the wellbore 102 to isolate for a production operation.

Figure 4:
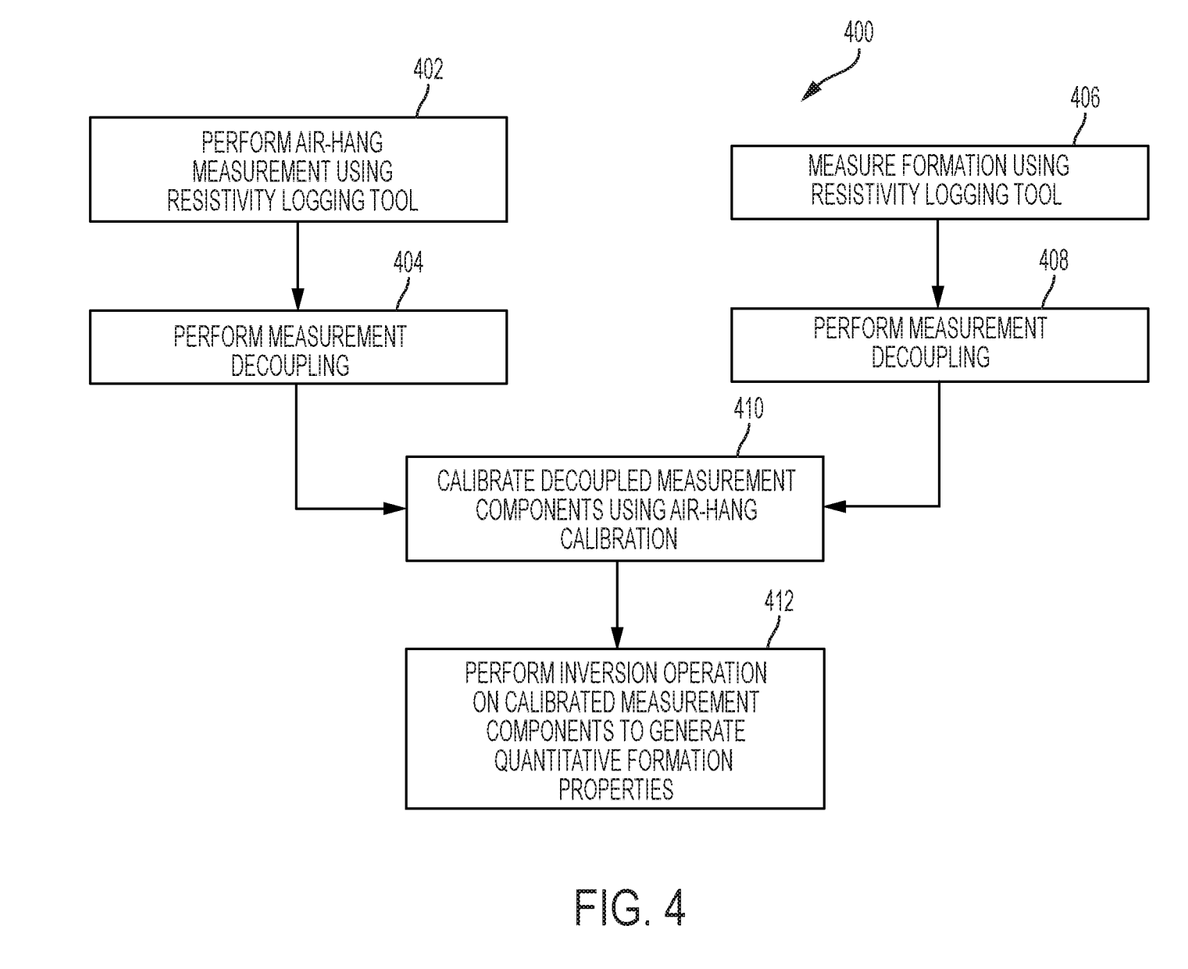
FIG. 4 is a flow chart of a process for air-hang calibrating formation measurement signals according to some aspects of the present disclosure.

FIG. 4 is a flowchart of a process 400 for air-hang calibrating formation measurement signals according to some aspects. Measurements taken by the resistivity-logging tool 126 are calibrated based on an air-hang calibration of the resistivity-logging tool 126 that removes irregularities in the measurements recorded by the resistivity-logging tool 126. For example, the resistivity-logging tool 126 may include a systematic bias due to the receivers 304, 306, and 308 not being collocated along the drill string 114 or the wireline tool 202.

At block 402, the process 400 involves performing an air-hang measurement using the resistivity-logging tool 126. The air-hang measurement involves taking a resistivity measurement with the resistivity-logging tool 126 when the resistivity-logging tool 126 is located sufficiently far from any conductive materials or partially conductive materials (e.g., 20 feet above ground level). For example, the resistivity-logging tool 126 may be suspended in the air on a stand while performing a baseline resistivity measurement.

At block 404, the process 400 involves a computing system, such as the computer system 208, performing measurement decoupling on the resistivity measurement taken by the resistivity-logging tool 126. The measurement decoupling may include extracting useful components from a multi-component signal received by one or more of the receivers 304, 306, and 308. For example, the receivers 304, 306, and 308 read measurements $V_1$, $V_2$, and $V_3$ from the transmitter 302, respectively. From the measurements $V_1$, $V_2$, and $V_3$, Green's tensor $$\begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix}$$

is decoupled. In the matrix that represents Green's tensor, a first subscript denotes a component of the transmitter 302, and a second subscript denotes a component of the receivers 304, 306, and 308. For example, $Z_{xy}$ is a response of a receiver 304, 306, and 308 oriented in a y-direction as a result of the transmitter 302 oriented in an x-direction. That is, the value of the Z elements in the Green's tensor matrix is a measurement of a receiver 304, 306, or 308 when the receiver 304, 306, or 308 and the transmitter 302 are oriented in directions specified by the subscript. The x-direction, the y-direction, and the z-direction are defined by a coordinate system of the resistivity-logging tool 126, where an origin is at a center of the transmitter. For example, the z-direction aligns with a direction from a center of the receivers 304, 306, and 308 to a center of the transmitter 302 (i.e., along the axis 310), the x-direction is perpendicular to the z-direction, and the y-direction is perpendicular to both the x-direction and the z-direction.

As used during the measurement decoupling of block 404, Green's tensor may indicate a response at a location of the second receiver 306 caused by the transmitter 302. Because the tool is operating in air, which has the same effect on the signal from the transmitter 302 in any direction perpendicular to the z-direction, $Z_{xx}^{air}$ represents both $Z_{xx}^{air}$ and $Z_{yy}^{air}$. Therefore, $Z_{xx}^{air}$ and $Z_{zz}^{air}$ are displayed in the Green's tensor matrix while the remaining values are all zero. Further, because the calibration technique involves measurements taken in air (i.e., an air-hang calibration), the superscript "air" may be removed in Green's tensor, which results in the matrix $$\begin{bmatrix} Z_{xx} & 0 & 0 \\ 0 & Z_{xx} & 0 \\ 0 & 0 & Z_{zz} \end{bmatrix}.$$

The matrix $$\begin{bmatrix} Z_{xx} & 0 & 0 \\ 0 & Z_{xx} & 0 \\ 0 & 0 & Z_{zz} \end{bmatrix}$$

may be referred to as an air-hang calibration matrix.

The goal of measurement decoupling involves calculating values for $Z_{xx}^{R2}$ and $Z_{zz}^{R2}$ to use in calibrating the resistivity-logging tool 126 to correct any irregularities of the measurements received by the receivers 304, 306, and 308. To calculate the values for $Z_{xx}^{R2}$ and $Z_{zz}^{R2}$, a measured response by the receivers 304, 306, and 308 is given by the following equation:

$$V(\theta_T, \beta_T, \theta_R, \beta_R) = [\sin\theta_T\cos\beta_T \quad \sin\theta_T\sin\beta_T \quad \cos\theta_T] \quad \text{(Equation 1)}$$

$$\begin{bmatrix} Z_{xx} & 0 & 0 \\ 0 & Z_{xx} & 0 \\ 0 & 0 & Z_{zz} \end{bmatrix} \begin{bmatrix} \sin\theta_R\cos\beta_R \\ \sin\theta_R\sin\beta_R \\ \cos\theta_R \end{bmatrix} =$$

-continued
$$(\sin\theta_T\cos\beta_T\sin\theta_R\cos\beta_R + \sin\theta_T\sin\beta_T\sin\theta_R\sin\beta_R) \cdot$$
$$Z_{xx} + \cos\theta_T\cos\beta_R \cdot Z_{zz}$$

where $\theta_T$ is the tilted angle of the transmitter 302, $\beta_T$ is the azimuth angle of the transmitter 302, $\theta_R$ is the tilted angle of the receiver 304, 306, or 308, and $\beta_R$ is the azimuth angle of the receiver 304, 306, or 308.

Applying Equation 1 to each of the receivers 304, 306, and 308, the following equations are provided:

$$V_1 = (\sin\theta_T\cos\beta_T\sin\theta_{R1}\cos\beta_{R1} + \sin\theta_T\sin\beta_T\sin\theta_{R1}\sin\beta_{R1}) \cdot Z_{xx}^{R1} + \cos\theta_T\cos\beta_{R1} \cdot Z_{zz}^{R1} = A_1 \cdot Z_{xx}^{R2} + B_2 \cdot Z_{zz}^{R2}$$ (Equation 2)

$$V_2 = (\sin\theta_T\cos\beta_T\sin\theta_{R2}\cos\beta_{R2} + \sin\theta_T\sin\beta_T\sin\theta_{R2}\sin\beta_{R2}) \cdot Z_{xx}^{R1} + \cos\theta_T\cos\beta_{R2} \cdot Z_{zz}^{R2} = A_2 \cdot Z_{xx}^{R2} + B_2 \cdot Z_{zz}^{R2}$$ (Equation 3)

$$V_3 = (\sin\theta_T\cos\beta_T\sin\theta_{R3}\cos\beta_{R3} + \sin\theta_T\sin\beta_T\sin\theta_{R3}\sin\beta_{R3}) \cdot Z_{xx}^{R3} + \cos\theta_T\cos\beta_{R3} \cdot Z_{zz}^{R3} = A_3 \cdot Z_{xx}^{R3} + B_3 \cdot Z_{zz}^{R3}$$ (Equation 4)

where $V_1$, $V_2$, and $V_3$ are measurements at the receivers 304, 306, and 308 respectively. Values for $\theta_T$, $\theta_{R1}$, $\theta_{R2}$, $\theta_{R3}$ may all be 45 degrees, values for $\beta_{R1}$ may be $\beta_T+\beta_{off}-120°$, values for $\beta_{R2}$ may be $\beta_T+\beta_{off}$, and values for $\beta_{R3}$ may be $\beta_T+\beta_{off}+120°$. Additionally, $\beta_{off}$ may represent an offset azimuth angle of the receiver 306 from the azimuth angle of the transmitter 302. Other tilt angles and azimuth angles are also contemplated within the scope of this disclosure.

$V_1$, $V_2$, and $V_3$ may be derived using the values of $Z_{xx}^{R2}$ and $Z_{zz}^{R2}$, as in the following equation:

$$\begin{bmatrix} C_{12}V_1 \\ V_2 \\ C_{32}V_3 \end{bmatrix} = \begin{bmatrix} A_1 & B_1 \\ A_2 & B_2 \\ A_3 & B_3 \end{bmatrix} \cdot \begin{bmatrix} Z_{xx}^{R2} \\ Z_{zz}^{R2} \end{bmatrix} = \overline{\overline{T}}_4 \cdot \begin{bmatrix} Z_{xx}^{R2} \\ Z_{zz}^{R2} \end{bmatrix}$$ (Equation 5)

where $C_{12}$ and $C_{32}$ are correcting factors introduced to remove a dependence of $V_1$ on $Z_{zz}^{R1}$ and $Z_{xx}^{R1}$ and to remove a dependence of $V_3$ on $Z_{zz}^{R3}$ and $Z_{xx}^{R3}$. An equivalent representation of Equation 5 is as follows:

$$\begin{bmatrix} V_2 \\ C_{12}V_1 + C_{32}V_3 \\ C_{12}V_1 - C_{32}V_3 \end{bmatrix} = \begin{bmatrix} A_2 & B_2 \\ A_1 + A_3 & B_2 + B_3 \\ A_1 - A_3 & B_2 - B_3 \end{bmatrix} \cdot \begin{bmatrix} Z_{xx}^{R2} \\ Z_{zz}^{R2} \end{bmatrix} = \overline{\overline{T}}_5 \cdot \begin{bmatrix} Z_{xx}^{R2} \\ Z_{zz}^{R2} \end{bmatrix}$$ (Equation 6)

Solving for $Z_{xx}^{R2}$ and $Z_{zz}^{R2}$ using Equation 5 provides:

$$\begin{bmatrix} Z_{xx}^{R2} \\ Z_{zz}^{R2} \end{bmatrix} = \left( \overline{T}_4^H \cdot \overline{T}_4 \right)^{-1} \cdot \overline{T}_4^H \cdot \begin{bmatrix} C_{12}V_1 \\ V_2 \\ C_{32}V_3 \end{bmatrix}$$ (Equation 7)

And solving for $Z_{xx}^{R2}$ and $Z_{zz}^{R2}$ using Equation 6 provides:

$$\begin{bmatrix} Z_{xx}^{R2} \\ Z_{zz}^{R2} \end{bmatrix} = \left( \overline{T}_5^H \cdot \overline{T}_5 \right)^{-1} \cdot \overline{T}_5^H \cdot \begin{bmatrix} V_2 \\ C_{12}V_1 + C_{32}V_3 \\ C_{12}V_1 - C_{32}V_3 \end{bmatrix}$$ (Equation 8)

To determine the values of $C_{12}$ and $C_{32}$ that are used to solve for $Z_{xx}^{R2}$ and $Z_{zz}^{R2}$, a physical model based on Green's theorem of electromagnetism provides:

$$\overline{\overline{H}}(r) = \frac{e^{ikr}}{4\pi r^3} \begin{bmatrix} k^2r^2 + ikr - 1 & 0 & 0 \\ 0 & k^2r^2 + ikr - 1 & 0 \\ 0 & 0 & 2 - 2ikr \end{bmatrix}$$ (Equation 9)

where k is a wavenumber in air. Using Equation 9, the values of $C_{12}$ and $C_{32}$ are calculated with the following equations:

$$C_{12} = \frac{[\sin\theta_T\cos\beta_T \;\; \sin\theta_T\sin\beta_T \;\; \cos\theta_T]\overline{\overline{H}}(S_2)\begin{bmatrix} \sin\theta_{R1}\cos\beta_{R1} \\ \sin\theta_{R1}\sin\beta_{R1} \\ \cos\theta_{R1} \end{bmatrix}}{[\sin\theta_T\cos\beta_T \;\; \sin\theta_T\sin\beta_T \;\; \cos\theta_T]\overline{\overline{H}}(S_1)\begin{bmatrix} \sin\theta_{R1}\cos\beta_{R1} \\ \sin\theta_{R1}\sin\beta_{R1} \\ \cos\theta_{R1} \end{bmatrix}}$$ (Equation 10)

$$C_{32} = \frac{[\sin\theta_T\cos\beta_T \;\; \sin\theta_T\sin\beta_T \;\; \cos\theta_T]\overline{\overline{H}}(S_2)\begin{bmatrix} \sin\theta_{R3}\cos\beta_{R3} \\ \sin\theta_{R3}\sin\beta_{R3} \\ \cos\theta_{R3} \end{bmatrix}}{[\sin\theta_T\cos\beta_T \;\; \sin\theta_T\sin\beta_T \;\; \cos\theta_T]\overline{\overline{H}}(S_3)\begin{bmatrix} \sin\theta_{R3}\cos\beta_{R3} \\ \sin\theta_{R3}\sin\beta_{R3} \\ \cos\theta_{R3} \end{bmatrix}}$$ (Equation 11)

where $S_1$ is a distance between the receiver 304 and the transmitter 302, $S_2$ is a distance between the receiver 306 and the transmitter 302, and $S_3$ is a distance between the receiver 308 and the transmitter 302. In this manner, the value of $C_{12}$ is based, in part, on a distance between the receiver 304 and the receiver 306 (i.e., taking into account the values of $S_1$ and $S_2$), and the value of $C_{32}$ is based, in part, on a distance between the receiver 306 and the receiver 308 (i.e., taking into account the values of $S_2$ and $S_3$). Further, each of $C_{12}$ and $C_{32}$ are based on Green's theorem of electromagnetism.

In an embodiment where a downhole measurement is corrupted by noise, the Tikhonov regularization may be applied to add robustness to the calculation of $Z_{xx}^{R2}$ and $Z_{zz}^{R2}$. Applying the Tikhonov regularization to Equation 7 and Equation 8 results in the following equations:

$$\begin{bmatrix} Z_{xx}^{R2} \\ Z_{zz}^{R2} \end{bmatrix} = \left( \overline{T}_4^H \cdot \overline{T}_4 + \lambda \overline{I} \right)^{-1} \cdot \overline{T}_4^H \cdot \begin{bmatrix} C_{12}V_1 \\ V_2 \\ C_{32}V_3 \end{bmatrix}$$ (Equation 12)

$$\begin{bmatrix} Z_{xx}^{R2} \\ Z_{zz}^{R2} \end{bmatrix} = \left( \overline{T}_5^H \cdot \overline{T}_5 + \lambda \overline{I} \right)^{-1} \cdot \overline{T}_5^H \cdot \begin{bmatrix} V_2 \\ C_{12}V_1 + C_{32}V_3 \\ C_{12}V_1 - C_{32}V_3 \end{bmatrix}$$ (Equation 13)

where a regularization factor $\lambda$ is determined using an L-curve method. Using Equations 7, 8, 12, or 13 as a basis for the calculation of $Z_{xx}^{R2}$ and $Z_{zz}^{R2}$ and the air-hang calibration matrix results in continuity at a singularity condition and removal of systematic bias of the resistivity-logging tool 126 from the measurements.

Turning now to operation of the resistivity-logging tool 126 in a downhole environment within the wellbore 102, at block 406, the process 400 involves the resistivity-logging tool 126 performing a formation resistivity measurement on the formation 104. As opposed to the air-hang measurement described above at block 402, the formation resistivity measurement is performed within the wellbore 102. For example, the resistivity-logging tool 126 may operate on the drill string 114 or the wireline logging tool 202 to take the formation resistivity measurement.

At block 408, the process 400 involves the computing system, such as the computer system 208, performing measurement decoupling on the formation resistivity measurements taken by the resistivity-logging tool 126. Similar to the air-hang decoupling operation at block 404, the formation measurement decoupling involves extracting useful components from a multi-component signal. For example, the receivers 304, 306, and 308 read measurements $V_1$, $V_2$, and $V_3$ from the transmitter 302, respectively. From the measurements $V_1$, $V_2$, and $V_3$, Green's tensor, $$\begin{bmatrix} Z_{xx}^{DH} & 0 & 0 \\ 0 & Z_{yy}^{DH} & 0 \\ 0 & 0 & Z_{zz}^{DH} \end{bmatrix},$$

is decoupled. The superscript DH represents that the response occurs in a downhole location within the wellbore 102. The resulting matrix may be referred to as a decoupled formation measurement matrix.

At block 410, the process 400 involves the computing system, such as the computer system 208, calibrating the decoupled measurement components identified at block 408 using air-hang calibration. The values $Z_{xx}^{R2}$ and $Z_{zz}^{R2}$ of the air-hang calibration matrix found at block 404 are used to offset irregularities associated with the receivers 304, 306, and 308. For example, $Z_{xx}^{R2}$ may be subtracted from $Z_{xx}^{DH}$ and $Z_{yy}^{DH}$. Additionally, $Z_{xx}^{R2}$ may be subtracted from $Z_{zz}^{DH}$ to remove signal irregularities associated with the resistivity-logging tool 126 in a manner that does not fail at a singularity condition and removes systematic bias associated with the varying distances S1-S3 of the receivers 304, 306, and 308 from the transmitter 302. The resulting matrix of the calibration process may be referred to as a calibrated formation measurement matrix.

At block 412, the process 400 involves the computing system, such as the computer system 208, performing an inversion operation on the calibrated measurement components to generate quantitative formation properties. The inversion operation may involve generating a model of Earth layers of the formation 104 based on the calibrated measurements of the resistivity-logging tool 126. The computer system 208 may perform one or more inversion techniques to generate the quantitative formation properties. In an embodiment, the inversion operation may involve generating a two-dimensional representation of a location of the layers of the formation 104 surrounding the wellbore 102. In other embodiments, the inversion operation may involve generating a three-dimensional representation of the layers of the formation 104 surrounding the wellbore 102. Other inversion techniques are also contemplated within the scope of this disclosure that make use of the calibrated measurements of the resistivity-logging tool 126.

Additionally, the quantitative formation properties identified by the inversion operation may guide steering operations for the drill bit 118 in a directional drilling environment. For example, when the inversion operation on the calibrated measurements indicates that the drill bit 118 is presently within the pay zone of the formation 104, a steering system for the drill bit 118 may be controlled by the computing system to drill in a direction that stays within the pay zone. In this manner, the wellbore 102 may be generated with a focus on increasing surface area of the wellbore 102 within the pay zone of the formation 104.

In some aspects, systems, devices, and methods for using a resistivity-logging tool using air-hang calibration are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method, comprising: performing an air-hang measurement using a resistivity-logging tool; performing a first measurement decoupling operation on the air-hang measurement, wherein the first measurement decoupling operation comprises: generating correcting factors based on a physical model; and calculating an air-hang calibration matrix based on the correcting factors; performing a formation measurement using the resistivity-logging tool; performing a second measurement decoupling operation on the formation measurement to generate a decoupled formation measurement matrix; and calibrating the resistivity-logging tool to generate a calibrated formation measurement matrix by subtracting the air-hang calibration matrix from the decoupled formation measurement matrix.

Example 2 is the method of example 1, further comprising: performing an inversion operation on the calibrated formation measurement matrix to generate quantitative formation properties; and steering a drill bit within a wellbore based on the quantitative formation properties.

Example 3 is the method of examples 1 or 2, wherein the physical model is based on Green's theorem of electromagnetism.

Example 4 is the method of examples 1-3, wherein the air-hang calibration matrix comprises a response of a receiver oriented in an x-direction as a result of a transmitter oriented in the x-direction, and a response of the receiver oriented in a z-direction as a result of the transmitter oriented in the z-direction.

Example 5 is the method of examples 1-4, wherein the resistivity-logging tool is a very deep resistivity-logging tool, and the very deep resistivity-logging tool takes measurements of greater than 6 meters from a borehole.

Example 6 is the method of examples 1-5, wherein generating the correcting factors comprises: generating a first correcting factor based on a first distance between a first receiver and a second receiver of the resistivity-logging tool; and generating a second correcting factor based on a second distance between the second receiver and a third receiver of the resistivity-logging tool.

Example 7 is the method of examples 1-6, wherein generating the calibrated formation measurement matrix comprises removing systematic bias of the resistivity-logging tool and removing disruptions at singularity conditions.

Example 8 is the method of examples 1-7, wherein calculating the air-hang calibration matrix is further based on a Tikhonov regularization.

Example 9 is a non-transitory computer-readable medium that includes instructions that are executable by a processing device to perform operations comprising: receiving results of an air-hang measurement using a resistivity-logging tool; performing a first measurement decoupling operation on the air-hang measurement, wherein the first measurement decoupling operation comprises: generating correcting factors based on a physical model, distances between a set of receivers of the resistivity-logging tool, and device parameters of the set of receivers and a transmitter of the resistivity-logging tool; and calculating an air-hang calibration matrix based on the correcting factors; receiving results of a formation measurement using the resistivity-logging tool; performing a second measurement decoupling operation on the formation measurement to generate a decoupled formation measurement matrix; and calibrating the decoupled formation measurement matrix to generate a calibrated formation measurement matrix by subtracting the air-hang calibration matrix from the decoupled formation measurement matrix.

Example 10 is the non-transitory computer-readable medium of examples 9, wherein the device parameters of the set of receivers and the transmitter comprise tilt angles and azimuth angles of the set of receivers and the transmitter.

Example 11 is the non-transitory computer-readable medium of examples 9 or 10, wherein the set of receivers comprises three receivers, and each of the three receivers is positioned at a different distance from the transmitter.

Example 12 is the non-transitory computer-readable medium of examples 9-11, wherein the air-hang measurement is performed at a location remote from any conductive materials or partially conductive materials.

Example 13 is the non-transitory computer-readable medium of examples 9-12, wherein the physical model is based on Green's theorem of electromagnetism.

Example 14 is the non-transitory computer-readable medium of examples 9-13, wherein the formation measurement is performed during a logging while drilling operation, and the instructions are executable by the processing device to perform operations comprising: performing an inversion operation on the calibrated formation measurement matrix to generate quantitative formation properties; and steering a drill bit based on the quantitative formation properties.

Example 15 is the non-transitory computer-readable medium of example 14, wherein the quantitative formation properties comprise a representation of a location of formation layers surrounding a wellbore.

Example 16 is a resistivity-logging system, the resistivity-logging system comprising: a resistivity-logging tool to measure formation resistivity within a wellbore, wherein the resistivity-logging tool comprises an electromagnetic signal transmitter and a set of receivers; a processing device; and a memory device in which instructions are stored that are executable by the processing device for causing the processing device to: perform an air-hang measurement using the resistivity-logging tool; perform a first measurement decoupling operation on the air-hang measurement, wherein the first measurement decoupling operation comprises: generating correcting factors based on a physical model; and calculating an air-hang calibration matrix based on the correcting factors; perform a formation measurement using the resistivity-logging tool; perform a second measurement decoupling operation on the formation measurement to generate a decoupled formation measurement matrix; and calibrate the decoupled formation measurement matrix to generate a calibrated formation measurement matrix by subtracting the air-hang calibration matrix from the decoupled formation measurement matrix.

Example 17 is the resistivity-logging system of example 16, wherein the instructions stored in the memory device are executable by the processing device for causing the processing device to: perform an inversion operation on the calibrated formation measurement matrix to generate quantitative formation properties; and control a drill bit steering operation based on the quantitative formation properties.

Example 18 is the resistivity-logging system of example 17, wherein the quantitative formation properties comprise a three-dimensional representation of layers of a formation surrounding the wellbore.

Example 19 is the resistivity-logging system of examples 16-18, wherein generating the correcting factors is based on a distance of each receiver of the set of receivers from the electromagnetic signal transmitter.

Example 20 is the resistivity-logging system of examples 16-19, wherein the resistivity-logging tool is positioned along a wireline logging tool.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method, comprising:
performing an air-hang measurement using a resistivity-logging tool;
performing a first measurement decoupling operation on the air-hang measurement, wherein the first measurement decoupling operation comprises:
generating correcting factors based on a physical model; and
calculating an air-hang calibration matrix based on the correcting factors;
performing a formation measurement using the resistivity-logging tool;
performing a second measurement decoupling operation on the formation measurement to generate a decoupled formation measurement matrix; and
calibrating the resistivity-logging tool to generate a calibrated formation measurement matrix by subtracting the air-hang calibration matrix from the decoupled formation measurement matrix.

2. The method of claim 1, further comprising:
performing an inversion operation on the calibrated formation measurement matrix to generate quantitative formation properties; and
steering a drill bit within a wellbore based on the quantitative formation properties.

3. The method of claim 1, wherein the physical model is based on Green's theorem of electromagnetism.

4. The method of claim 1, wherein the air-hang calibration matrix comprises a response of a receiver oriented in an x-direction as a result of a transmitter oriented in the x-direction, and a response of the receiver oriented in a z-direction as a result of the transmitter oriented in the z-direction.

5. The method of claim 1, wherein the resistivity-logging tool is a very deep resistivity-logging tool, and the very deep resistivity-logging tool takes measurements of greater than 6 meters from a borehole.

6. The method of claim 1, wherein generating the correcting factors comprises:
generating a first correcting factor based on a first distance between a first receiver and a second receiver of the resistivity-logging tool; and
generating a second correcting factor based on a second distance between the second receiver and a third receiver of the resistivity-logging tool.

7. The method of claim 1, wherein generating the calibrated formation measurement matrix comprises removing systematic bias of the resistivity-logging tool and removing disruptions at singularity conditions.

8. The method of claim 1, wherein calculating the air-hang calibration matrix is further based on a Tikhonov regularization.

9. A non-transitory computer-readable medium that includes instructions that are executable by a processing device to perform operations comprising:
   receiving results of an air-hang measurement using a resistivity-logging tool;
   performing a first measurement decoupling operation on the air-hang measurement, wherein the first measurement decoupling operation comprises:
      generating correcting factors based on a physical model, distances between a set of receivers of the resistivity-logging tool, and device parameters of the set of receivers and a transmitter of the resistivity-logging tool; and
      calculating an air-hang calibration matrix based on the correcting factors;
   receiving results of a formation measurement using the resistivity-logging tool;
   performing a second measurement decoupling operation on the formation measurement to generate a decoupled formation measurement matrix; and
   calibrating the decoupled formation measurement matrix to generate a calibrated formation measurement matrix by subtracting the air-hang calibration matrix from the decoupled formation measurement matrix.

10. The non-transitory computer-readable medium of claim 9, wherein the device parameters of the set of receivers and the transmitter comprise tilt angles and azimuth angles of the set of receivers and the transmitter.

11. The non-transitory computer-readable medium of claim 9, wherein the set of receivers comprises three receivers, and each of the three receivers is positioned at a different distance from the transmitter.

12. The non-transitory computer-readable medium of claim 9, wherein the air-hang measurement is performed at a location remote from any conductive materials or partially conductive materials.

13. The non-transitory computer-readable medium of claim 9, wherein the physical model is based on Green's theorem of electromagnetism.

14. The non-transitory computer-readable medium of claim 9, wherein the formation measurement is performed during a logging while drilling operation, and the instructions are executable by the processing device to perform operations comprising:
   performing an inversion operation on the calibrated formation measurement matrix to generate quantitative formation properties; and
   steering a drill bit based on the quantitative formation properties.

15. The non-transitory computer-readable medium of claim 14, wherein the quantitative formation properties comprise a representation of a location of formation layers surrounding a wellbore.

16. A resistivity-logging system, the resistivity-logging system comprising:
   a resistivity-logging tool to measure formation resistivity within a wellbore, wherein the resistivity-logging tool comprises an electromagnetic signal transmitter and a set of receivers;
   a processing device; and
   a memory device in which instructions are stored that are executable by the processing device for causing the processing device to:
      perform an air-hang measurement using the resistivity-logging tool;
      perform a first measurement decoupling operation on the air-hang measurement, wherein the first measurement decoupling operation comprises:
         generating correcting factors based on a physical model; and
         calculating an air-hang calibration matrix based on the correcting factors;
      perform a formation measurement using the resistivity-logging tool;
      perform a second measurement decoupling operation on the formation measurement to generate a decoupled formation measurement matrix; and
      calibrate the decoupled formation measurement matrix to generate a calibrated formation measurement matrix by subtracting the air-hang calibration matrix from the decoupled formation measurement matrix.

17. The resistivity-logging system of claim 16, wherein the instructions stored in the memory device are executable by the processing device for causing the processing device to:
   perform an inversion operation on the calibrated formation measurement matrix to generate quantitative formation properties; and
   control a drill bit steering operation based on the quantitative formation properties.

18. The resistivity-logging system of claim 17, wherein the quantitative formation properties comprise a three-dimensional representation of layers of a formation surrounding the wellbore.

19. The resistivity-logging system of claim 16, wherein generating the correcting factors is based on a distance of each receiver of the set of receivers from the electromagnetic signal transmitter.

20. The resistivity-logging system of claim 16, wherein the resistivity-logging tool is positioned along a wireline logging tool.

* * * * *